United States Patent [19]

Sukekawa et al.

[11] 4,443,406
[45] Apr. 17, 1984

[54] HEAT-RESISTANT AND CORROSION-RESISTANT WELD METAL ALLOY AND WELDED STRUCTURE

[75] Inventors: Masayuki Sukekawa, Kitaibaraki; Yoshimitsu Tobita; Seishin Kirihara, both of Hitachi; Hisashi Morimoto, Hiroshima; Kenichi Usami; Katsumi Iijima, both of Hitachi, all of Japan

[73] Assignees: Hitachi, Ltd.; Babcock-Hitachi Kabushiki Kaisha, both of Tokyo, Japan

[21] Appl. No.: 381,797

[22] Filed: May 24, 1982

[30] Foreign Application Priority Data

Jan. 22, 1982 [JP] Japan .................................. 57-7548

[51] Int. Cl.³ .............................................. C22C 30/00
[52] U.S. Cl. ...................................... 420/584; 420/586; 420/585; 428/685; 228/263.13; 219/146.23
[58] Field of Search ................ 75/122, 134 F, 134 N, 75/134 C; 428/681, 683, 678, 679, 685; 420/584, 585, 586; 228/263.13, 263.14, 263.15, 263.16

[56] References Cited

U.S. PATENT DOCUMENTS

| 2,994,605 | 8/1961 | Gill et al. | 420/584 |
| 3,288,575 | 11/1966 | Bystram et al. | 428/679 |
| 3,694,271 | 9/1972 | Egnell | 428/683 |
| 4,035,182 | 7/1977 | Kowaka et al. | 420/584 |

Primary Examiner—L. Dewayne Rutledge
Assistant Examiner—Debbie Yee
Attorney, Agent, or Firm—Antonelli, Terry & Wands

[57] ABSTRACT

A heat-resistant and corrosion-resistant weld metal alloy consisting essentially of, by weight, less than 0.08% of C, 0.1 to 1.0% of Si, 2 to 3% of Mn, 32 to 42% of Ni, 21 to 25% of Cr, 0.8 to 1.7% of Mo, 0.1 to 1.0% of Nb, up to 0.5% of Ti, up to 2% of Co, up to 2% of Cu, up to 1% of W, up to 0.2% of N, up to 1.0% of V, up to 1.0% of Zr, up to 1.0% of Ta and the balance Fe, wherein the following conditions are met: Ti+Zr≦1.0%, Ni+Co≦42%, W+V≦1.0%, Nb+Ta≦1.0%, and 4≦Nb/C≦15; and an austenitic welded structure composed of an austenitic structural alloy and of a weld metal of the above-mentioned kind are provided by the invention.

15 Claims, 17 Drawing Figures

HEAT-RESISTANT AND CORROSION-RESISTANT WELD METAL ALLOY AND WELDED STRUCTURE

BACKGROUND OF THE INVENTION

The present invention relates to a heat-resistant and corrosion-resistant weld metal alloy having superior high temperature ductility and high temperature strength.

More particularly, the invention is concerned with an austenitic welded structure for high temperature use and, still more particularly, to an austenitic welded structure having superior high temperature ductility, high temperature strength, corrosion resistance and fatigue life, and effective in preventing thermal stress cracking, suitable for use in hot spots in various plants such as chemical plants, thermal power plants, nuclear power plants, boilers and so forth.

Hitherto, austenitic stainless steels and heat-resistant alloy steels have been used as the material of structures used at a high temperature at which creep is liable to occur. Particularly, as the base metal of the structure at a high temperature higher than 600° C., an NCF steel (0.08%C-20%Cr-32%Ni-0.3%Ti-0.3%Al) is often used because of its superior creep rupture strength. (Throughout the specification, the compositions of materials are expressed in terms of percent by weight (wt%) unless otherwise specified.) Generally, chemical plants, thermal power plants, nuclear power plants and boilers have lot of welded structures. The fabrication of welded structure using the NCF steel as the base metal is made by means of a welding rod such as of Incoloy 138 (28%Cr-38%Ni-4%Mo-1%W-balance Fe), Inconel 182 (15%Cr-0.5%Ti-2%Nb-7%Mn-8%Fe-balance Ni), Inconel 112 (20%Cr-8%Mn-3.5%Nb+ta-7%Fe-balance Ni) and Inco Weld A (15%Cr-2%Nb-1.5%Mo-8%Fe-balance Ni). The weld metal formed with these welding rods, however, have only a small ductility at high temperature and exhibits a heavy embrittlement due to a change in the structure during the use at the high temperature. In addition, cracks are liable to be formed along the boundary in the weld zone due to a large difference in the thermal expansion coefficients attributable to the difference in compositions between the weld metal and the structural base metal of NCF steel. In order to overcome this problem, it has been attempted to fabricate the welded structure by using such a welding rod as would produce a weld metal of which thermal expansion coefficient becomes identical with that of the base metal of NCF steel, i.e. of which composition becomes identical with that of the base metal of NCF steel. In the welded structure fabricated with such a welding rod, however, the fluidity of the molten metal is deteriorated by formation of oxides of Ti and Al contained in the base metal during the welding to undesirably increase the occurrence of weld defects. It is of course possible to eliminate the Ti and Al contents in the base metal but the elimination of Ti and Al undesirably lowers the strength at high temperature.

SUMMARY OF THE INVENTION

It is an object of the invention to provide a heat-resistant and corrosion-resistant weld metal alloy having superior high temperature ductility and high temperature strength.

Another object of the invention is to provide an austenitic welded structure having superior creep rupture ductility and strength at high temperature and capable of avoiding generation of high thermal stress at high temperature.

In view of the facts that the NCF steel is a structure alloy steel strengthened with Al and Ti, and that the weld defects due to the existence of Al and Ti are liable to be formed when such a welding rod is used as would produce a weld metal having a thermal expansion coefficient identical with that of the base metal of this structural alloy steel, the present inventors have reached a conclusion that the above-mentioned objects are achieved by eliminating Al and Ti in order to make the thermal expansion coefficient of weld metal identical with that of structural alloy steel, by adding Mo in place of Al in order to strengthen the weld metal, and by adding a predetermined amount of Nb in place of Ti in order to achieve the desired ductility at high temperature.

The weld metal alloy in accordance with the invention can contain as required Ti, Co, Cu, W, N, V, Zr, Ta or the like elements besides the above-mentioned elements.

According to one aspect of the invention, there is provided a heat-resistant and corrosion-resistant weld metal alloy consisting essentially of less than 0.08% of C, 0.1 to 1.0% of Si, 2 to 3% of Mn, 32 to 42% of Ni, 21 to 25% of Cr, 0.8 to 1.7% of Mo, 0.1 to 1.0% of Nb, up to 0.5% of Ti, up to 2% of Co, up to 2% of Cu, up to 1% of W, up to 0.2% of N, up to 1.0% of V, up to 1.0% of Zr, up to 1.0% of Ta and the balance Fe, wherein the following conditions are met:

Ti+Zr≦1.0%;  Ni+Co≦42%;  W+V≦1.0%;  Nb+Ta≦1.0%; and 4≦Nb/C≦15.

According to another aspect of the invention, there is provided an austenitic welded structure composed of an austenitic structural alloy such as NCF steel and a weld metal of the kind described above. To cite an instance of such a welded structure, there is provided a welded structure composed of an austenitic structural alloy containing less than 0.08% of C, 0.1 to 3.5% of Si, 0.5 to 2.0% of Mn, 20 to 38% of Ni, 20.5 to 27% of Cr, 1.0 to 1.6% of Mo and 0.1 to 1% of Nb or, alternatively, an austenitic structural alloy containing, in addition to the above-mentioned constituents, 0.1 to 0.5% of Ti and/or Zr; and of a weld metal consisting essentially of 0.02 to 0.08% of C, 0.1 to 1.5% of Si, 2 to 3% of Mn, 32 to 38% of Ni, 21 to 25% of Cr, 1.0 to 1.6% of Mo, 0.1 to 1.0% of Nb and the balance Fe and inevitable impurities or, alternatively, a weld metal consisting essentially of 0.02 to 0.08% of C, 0.1 to 1.5% of Si, 2 to 3% of Mn, 32 to 38% of Ni, 21 to 25% of Cr, 1.0 to 1.6% of Mo, 0.1 to 1.0% of Nb, 0.1 to 0.5% of Ti and the balance Fe and inevitable impurities.

In the weld metal alloy and welded structure of the invention, composition ranges are limited for the following reasons.

Referring first to C which is added for increasing the high temperature strength, the strength is increases as the C content is increased but the workability is deteriorated if the C content is increased excessively. According to the invention, therefore, the C content is limited to be less than 0.08%, in order to improve the high temperature ductility without being accompanied by a reduction in the high temperature strength.

Figure 1:
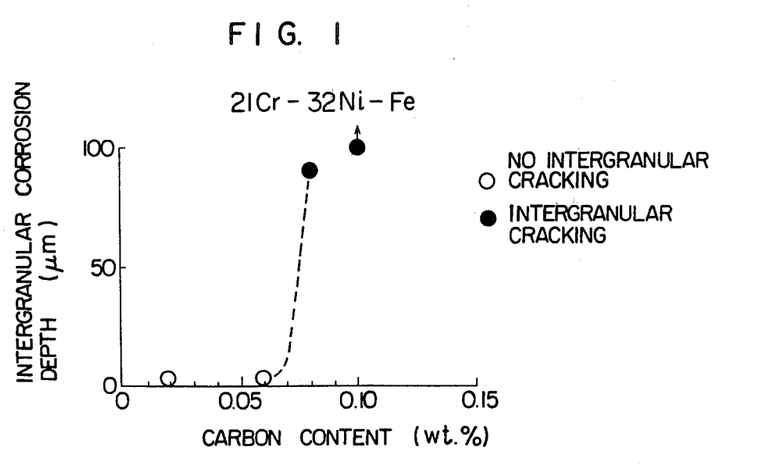
FIG. 1 is a graph showing a relationship between the C content and the intergranular corrosion depth.

From the result of a corrosion test as shown in FIG. 1, it is considered that the preferred range of C content is between 0.02 and 0.06%. The corrosion test was conducted with test pieces of 21Cr-32Ni-Fe alloy having various C contents, by dippling them for 72 hours in a solution consisting of $CuSo_4.5H_2O$, $H_4SO_4$ and distilled water and maintained at 100° C., bending the test pieces at a radius of curvature of 100R (R reprsesents the diameter of test piece) and then measuring the intergranular corrosion depth to obtain the result as shown in FIG. 1.

The Si is added for effecting deoxidation during melting of the raw material and welding. The Si content is selected to range between 0.1% and 1.5% because an Si content less than 0.1% cannot provide satisfactory deoxidation effect while an Si content in excess of 1.5% becomes liable to occur high temperature cracking in weld metal. An especially preferable range in Si content is between 0.1 and 1.0%. In the structural alloy, an Si content in excess of 3.8% extremely deteriorates productivity and workability thereby making it very difficult to produce the pipes and, in addition, precipitates the ferrite phase. Thus, the Si content in the structural alloy should be between 0.1 and 3.5%.

The Mn is an element which is added aiming at deoxidation and desulfurization during melting of raw material and welding. A too low Mn content cannot provide sufficient deoxidation and desulfurization effect while the effect is saturated when the Mn content is increased beyond 3.0%. Therefore, according to the invention, the Mn content is selected to range between 2.0 and 3.0%. A preferable Mn content in the structural steel is between 0.5 and 2.0%.

The Ni forms, in combination with the Cr, an austenitic structure and, hence, is essential for improving the oxidation resistance and high temperature strength. The weld metal of the invention contains Mo and Nb or, alternatively, Mo, Nb and Ti. Since the weld metal containing these elements are used for long period of time at high temperature, it becomes brittle due to precipitation of $\sigma$ phase if the Ni content is too low. To the contrary, if the Ni content is too high, the columnar grain in the weld metal is coarsened undesirably to increase the tendency of high temperature cracking and to deteriorate the high temperature ductility. Therefore, according to the invention, the Ni content is selected to range between 20 and 42%. More specifically, the preferred Ni content in the structural base metal ranges between 20 and 38%, while the preferred Ni content in the weld metal ranges between 32 and 42%.

The Cr is added to improve the oxidation resistance. A low Cr content has a risk of causing precipitation of $\sigma$ phase and a too low Cr content cannot ensure sufficient oxidation resistance. The Cr content in the weld metal, therefore, is selected to range between 21 and 25%.

The Mo effectively strengthens the austenite matrix and a part of Mo is precipitated as a carbide to increase the high temperature strength. The Mo is effective also in strengthening the grain boundary. An Mo content less than 0.8% cannot provide sufficient strength and ductility, while an Mo content in excess of 1.7% impractically deteriorates the workability and oxidation resistance and, in addition, promotes the precipitation of $\sigma$ phase. Therefore, the Mo content is selected to range between 0.8 and 1.7%, preferably between 1.0 and 1.6%.

Figure 2:
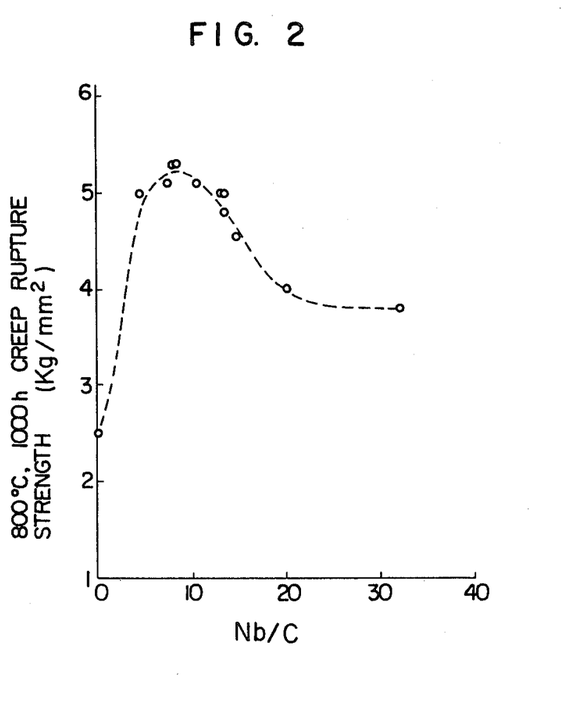
FIG. 2 is a graph showing a relationship between the creep rupture strength and Nb/C.
Figure 3:
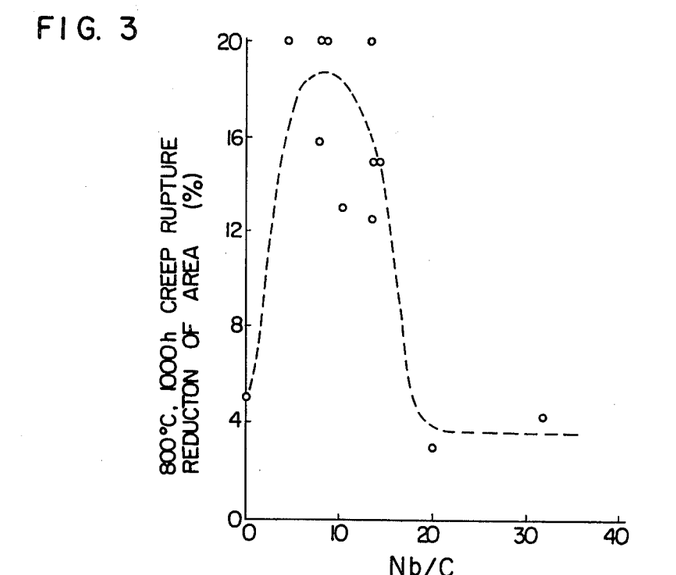
FIG. 3 is a graph showing the relationship between the creep rupture reduction of area and Nb/C.
Figure 4:
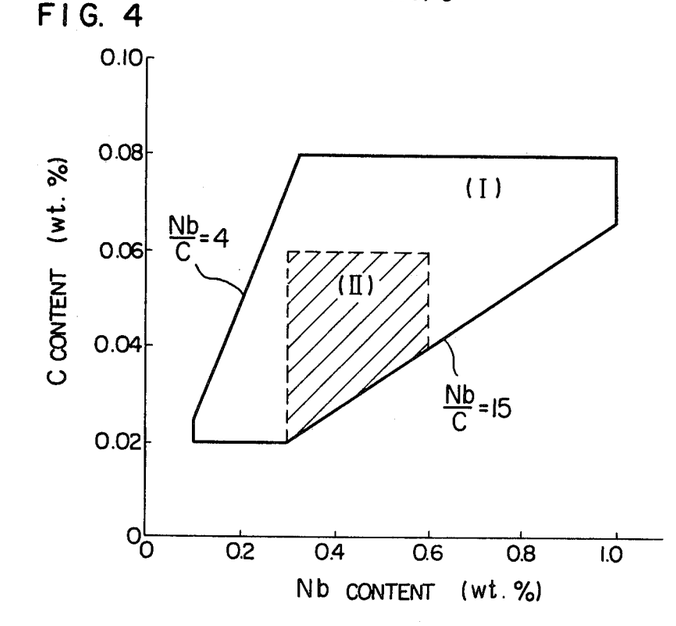
FIG. 4 is a graph showing how the Nb and C contents are related to Nb/C.

The Nb has a strong affinity to C and increases the high temperature strength through precipitation of carbides. The Nb serves also to reduce the oxygen content in the weld metal and suppresses the grain boundary precipitation of $M_{23}C_6$ type carbides so that restrains the embrittlement of grain boundary during long use thereby improving the strength and ductility. In order to obtain sufficient strength and ductility, the Nb content should range between 0.1 and 1.0%. The Nb may be partially substituted by Ta. In such a case, the sum of the Nb content and Ta content should range between 0.1 and 1.0%. Further, the ratio of Nb/C has a substantial significance because Nb has a strong affinity to C as stated before. FIGS. 2 and 3 show how the creep rupture strength and the creep rupture reduction of area at 800° C., 1000 hours are affected by the ratio Nb/C. From these Figures, it will be seen that the ratio Nb/C preferably should be around 8 for attaining the highest strength and ductility and that the acceptable range of the ratio Nb/C is between 4 and 15. FIG. 4 is a graph showing the mutual relationship between Nb content, C content and the ratio Nb/C. In FIG. 4, the region (I) shows a region suitable for attaining a rupture strength in excess of 4 kg/mm² and a reduction of area in excess of 10% in the 1000 hours creep test at 800° C. The hatched region (II) shows an optimum region.

By adding up to 0.5% of Ti and/or Zr, a portion thereof acts as a deoxidizer to lower the oxygen content in the weld metal thereby increasing the high temperature ductility, and the remainder thereof is precipitated as an MC type carbide in the weld metal to suppress the grain boundary precipitation of $M_{23}C_6$ type carbide thereby increasing the strength and ductility. A too high Ti content deteriorates the weldability to increase the tendency of formation of weld defects such as weld cracks, inclusions and so forth. To the contrary, a too low content of Ti and/or Zr cannot make the above-mentioned advantages appreciable. Therefore, when either one of Ti and Zr is contained solely, its content is preferably between 0.1 and 0.5%, whereas, when both of Ti and Zr are contained simultaneously, it is preferred that the Ti and Zr contents meet the condition of Ti+Zr≦1%.

The Co is an austenite former and improves the oxidation resistance. A too high Co content, however, increases the tendency of weld cracking and reduces the workability. The Co content, therefore, is limited to be up to 2%. Further, it is also preferred that, in relation to Ni content, the Co content be selected to satisfy the requirement of Ni+Co≦42%.

When the Ni content is high, the Cu dissolves into the matrix to stabilize the austenite and improves the corrosion resistance, and further improves the fluidity of the molten metal during welding. However, when the Cu content is too high, the above-mentioned effects are not increased further and, on the contrary, the workability is deteriorated. Therefore, the Cu content should be selected to be up to 2%.

The W and V are ferrite formers and are effective in suppressing the intergranular corrosion and in improving the strength. However, the ductility will be reduced if the W and V contents are too high. The W and/or V content, therefore, is selected to be up to 1%.

The N refines the grain during the welding and serves to stabilize the austenite and can be contained by an amount up to 0.2%.

The Ta brings about the same effect as the Nb, and it is desirable that the Ta is contained in such an amount that it falls in a suitable range of Nb/c ratio as a total of (Nb+Ta).

Figure 5A:
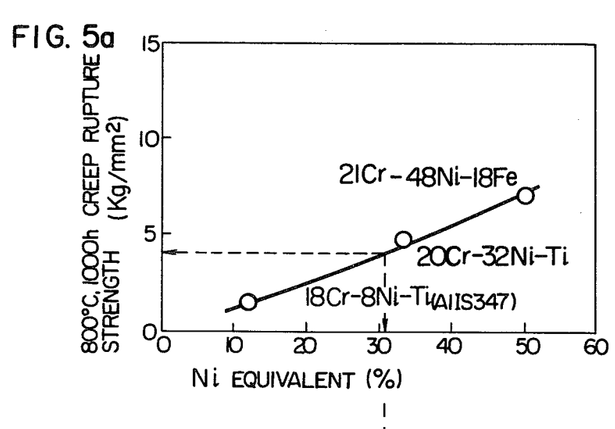
FIG. 5a is a graph showing a relationship between Ni equivalent and creep rupture strength.
Figure 5B:
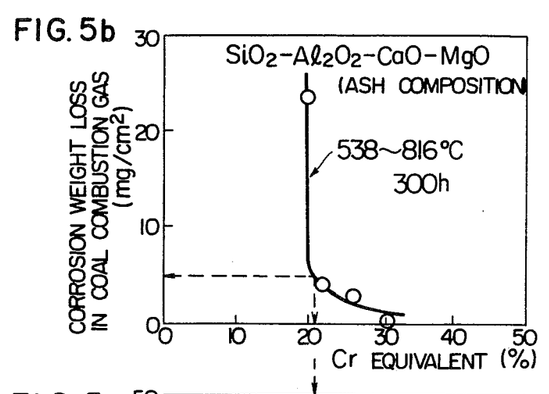
FIG. 5b is a graph showing a relationship between the Cr equivalent and corrosion weight loss in coal combustion gas.
Figure 5C:
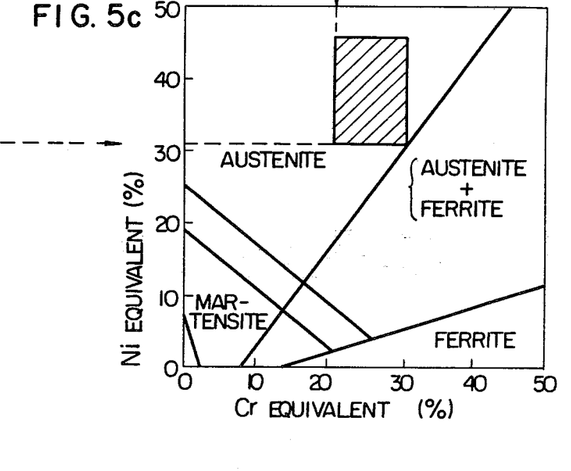
FIG. 5c is a graph showing a schaeffler's diagram.

FIG. 5a shows the relationship between 800° C., 1000 hr creep rupture strength and Ni-equivalent, while FIG. 5b shows the relationship between the Cr-equivalent and the corrosion weight loss of test piece after being subjected for 300 hours in a coal combustion gas of 538° to 816° C. FIG. 5c shows a Schaeffler's diagram.

The Ni equivalent and Cr equivalent are values expressed by the following formulae (1) and (2).

$$\text{Ni Eq.} = \%\text{Ni} + 30 \times \%\text{C} + 30 \times \%\text{N} + 0.5 \times \%\text{Mn} \quad (1)$$

$$\text{Cr Eq.} = \%\text{Cr} + \%\text{Mo} + 1.5 \times \%\text{Si} + 0.5 \times \%\text{Nb} \quad (2)$$

In order to withstand a long use at a high temperature, the weld metal is required to have a creep rupture strength of, for example, higher than 4 Kg/mm² in 800° C., 1000 hr creep test. In order to obtain a sufficient strength and high oxidation resistance, as well as a whole austenitic structure, it is preferred that the Ni Equivalent and Cr Equivalent fall within the hatched area in FIG. 5c, i.e. to meet the following conditions:
31≦Ni Eq.≦46, and
20.5≦Cr Eq.≦30.

The weld metal in accordance with the invention is an Fe alloy containing predetermined amounts of the above-mentioned elements, so that the balance is naturally Fe. However, to contain inevitable trace impurities, e.g. P and S, does not matter so long as such impurities don't hinder the attainment of the desired effects of the weld metal of the invention. Further, with respect to the structural alloy steel, it is preferred that the Ni Equivalent and Cr Equivalent fall within the area shown in FIG. 14, i.e. to meet the following conditions:
22≦Ni Eq.≦38, and
24≦Cr Eq.≦33.

DESCRIPTION OF THE PREFERRED EMBODIMENTS

The invention will be more fully explained hereinunder through description of preferred embodiments.

EXAMPLE 1

Welding was conducted on structural alloys Nos. 9 to 11 shown in Table 1 with weld metals Nos. 2 to 8 in the same Table to produce welded structures on which various tests were conducted. An NCF steel was used as the structural alloy for the weld metal No. 1. The welding was conducted with welding current of 150 A, voltage of 21 to 23 V and at a welding speed of 150 mm/min. The thermal expansion coefficients of tested materials are shown in Table 2.

TABLE 1

| | | No. | C | Si | Mn | Ni | Cr | Mo | Nb | Ti | Zr | Fe |
|---|---|---|---|---|---|---|---|---|---|---|---|---|
| Weld metal | * | 1 | 0.03 | 0.44 | 0.26 | 61.5 | 21.0 | 8.8 | 3.5 | | | 7.0 |
| | Comparative material | 2 | 0.075 | 0.47 | 1.96 | 31.8 | 24.1 | | | | | bal. |
| | | 3 | 0.072 | 0.70 | 3.17 | 39.0 | 22.4 | | | | | bal. |
| | | 4 | 0.085 | 1.40 | 3.21 | 38.1 | 22.6 | 0.64 | | 0.17 | | bal. |
| | | 5 | 0.018 | 0.60 | 2.45 | 33.3 | 22.5 | 1.32 | 0.58 | | | bal. |
| | Material of invention | 6 | 0.042 | 0.49 | 2.38 | 38.0 | 21.8 | 1.55 | 0.33 | | | bal. |
| | | 7 | 0.025 | 0.80 | 2.68 | 33.9 | 23.4 | 1.40 | 0.33 | 0.15 | | bal. |
| | | 8 | 0.073 | 0.59 | 2.47 | 32.7 | 22.4 | 1.28 | 0.61 | | | bal. |
| Structural alloy | Material of invention | 9 | 0.032 | 0.80 | 0.90 | 34.0 | 23.0 | 1.30 | 0.32 | 0.15 | | bal. |
| | | 10 | 0.035 | 0.82 | 0.92 | 33.8 | 23.8 | 1.32 | 0.34 | 0.06 | 0.06 | bal. |
| | | 11 | 0.032 | 0.80 | 0.90 | 34.0 | 23.0 | 1.30 | 0.32 | | | bal. |

* known material

TABLE 2

| | (× 10⁻⁶/°C.) | |
|---|---|---|
| | 700° C. | 800° C. |
| No. 1 | 15.0 | 15.5 |
| Nos. 6 to 8 | 17.5 | 18.0 |
| Nos. 9 to 11 | 17.5 | 18.0 |

The results of the various tests are shown in Table 3. In Table 3, Nos. 2 to 8 show the results of the tests conducted on welded structures obtained by welding weld metal Nos. 2 to 8 to the structural alloy No. 9.

TABLE 3

| No. | FISCO cracking ratio (%) | 800° C., 1000 h creep rupture strength (Kg/mm²) | 800° C., 1000 h creep rupture elongation (%) | 800° C. $\Delta\epsilon_t = 0.7\%$ low cycle fatigue life (cycle) |
|---|---|---|---|---|
| 1 | 23 | 5.0 | 4 | 420 |
| 2 | 24 | 3.5 | 4 | 380 |
| 3 | 25 | 3.6 | 4 | 370 |
| 4 | 30 | 3.8 | 4 | 390 |
| 5 | 34 | 4.6 | 4 | 320 |
| 6 | 13 | 5.0 | 11 | 650 |
| 7 | 18 | 5.0 | 8 | 620 |
| 8 | 15 | 5.3 | 8 | 610 |

Table 3 shows the following facts.

While the conventional material and comparative materials Nos. 1 to 5 exhibit high FISCO cracking ratio of 23 to 34%, the material Nos. 6 to 8 in accordance with the invention exhibits much smaller FISCO cracking ratio of 13 to 18%.

The materials of the invention exhibit creep rupture strength of 5 kg/mm² in 800° C., 1000 hr creep rupture test. This strength is equivalent to or greater than those of the conventional materials.

The creep rupture elongation of the materials of the invention in 800° C., 1000 hr creep rupture test is 8% or greater. Thus, the materials of the invention exhibit a ductility which is two or more times as high as those of the conventional materials.

Similar effects were confirmed with the welded structures obtained by welding the weld metal Nos. 2 to 8 to the structural alloy Nos. 10 and 11, respectively. Particularly, the welded structure formed with the structural alloy No. 11 exhibited superior creep rupture strength and creep rupture elongation over a long period of time exceeding 1000 hours at 800° C.

As will be seen from the foregoing explanation, according to the welded structure of the invention in Example 1, it is possible to avoid the concentration of thermal stress to the weld zone without deteriorating the weldability, while ensuring a long fatigue life. Thus, the welded structure of the invention in Example 1 can withstand to the repeated applications of thermal stress and can stand long use without fear of cracking in weld zone.

EXAMPLE 2

Welded structures were produced using weld metals of various compositions as shown in Table 4 and using Incoloy 800 as the austenitic structural steel. In Table 4, sample No. 1 is Inconel 116 which is known per se, and sample Nos. 2 to 5 are also known weld metals. Sample Nos. 6 to 9 are weld metals in accordance with the invention. The compositions are expressed in terms of percent by weight (wt%). The terminal expansion coefficients of the base metal (Incoloy 800) at 700° C., 800° C. and 900° C. were 17.5×10⁻⁶/°C., 18.0×10⁻⁶/°C. and 18.5×10⁻⁶/°C., respectively, which were equivalent to those of the sample material Nos. 6 to 9 in accordance with the invention.

TABLE 4

| | No. | C | Si | Mn | Ni | Cr | Mo | Nb | Ti | Zr | Fe |
|---|---|---|---|---|---|---|---|---|---|---|---|
| Comparative material | 1 | 0.03 | 0.44 | 0.26 | 61.5 | 21.0 | 8.8 | 3.5 | — | — | 7.0 |
| | 2 | 0.08 | 0.47 | 1.96 | 31.8 | 24.0 | — | — | — | — | bal. |
| | 3 | 0.07 | 0.46 | 2.24 | 34.3 | 23.3 | — | — | — | — | bal. |
| | 4 | 0.09 | 1.40 | 3.21 | 38.1 | 22.6 | 1.64 | — | 0.17 | — | bal. |
| | 5 | 0.05 | 1.35 | 2.37 | 38.4 | 22.3 | 1.16 | — | 0.27 | — | bal. |
| Material of invention | 6 | 0.023 | 0.84 | 2.68 | 33.78 | 23.26 | 1.32 | 0.33 | 0.14 | — | bal. |
| | 7 | 0.026 | 0.99 | 2.50 | 34.19 | 22.91 | 1.32 | 0.35 | — | 0.10 | bal. |
| | 8 | 0.025 | 0.90 | 2.51 | 34.02 | 23.06 | 1.32 | 0.34 | 0.14 | 0.12 | bal. |
| | 9 | 0.072 | 0.60 | 2.50 | 32.96 | 22.46 | 1.30 | 0.32 | 0.15 | 0.14 | bal. |

The welding was conducted with welding current of 150 A (D.C.) and voltage of 21 to 23 V at a welding speed of 150 mm/min.

[FISCO cracking ratio]

Figure 6:
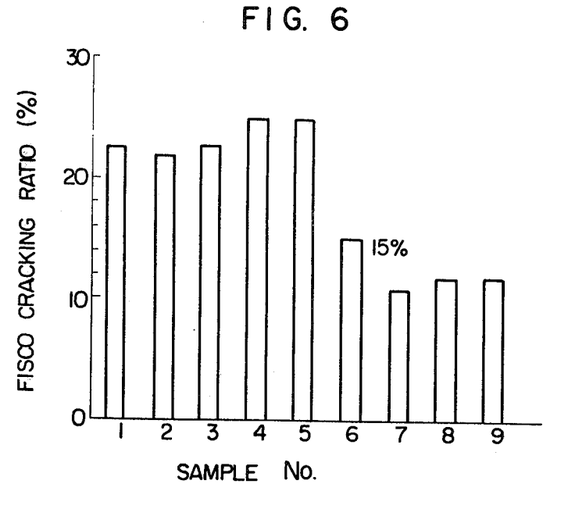
FIG. 6 is a bar graph showing the Fisco cracking ratio in the samples of Examples 2 of the invention.

FIG. 6 shows FISCO cracking ratios of various weld metals. As will be seen from this Figure, while the sample material Nos. 1 to 5 showed high FISCO cracking ratio of 22 to 25%, the weld metal Nos. 6 to 9 in accordance with the invention exhibited much smaller FISCO cracking ratio of less than 15% advantageously.

[Creep rupture test]

Figure 7:
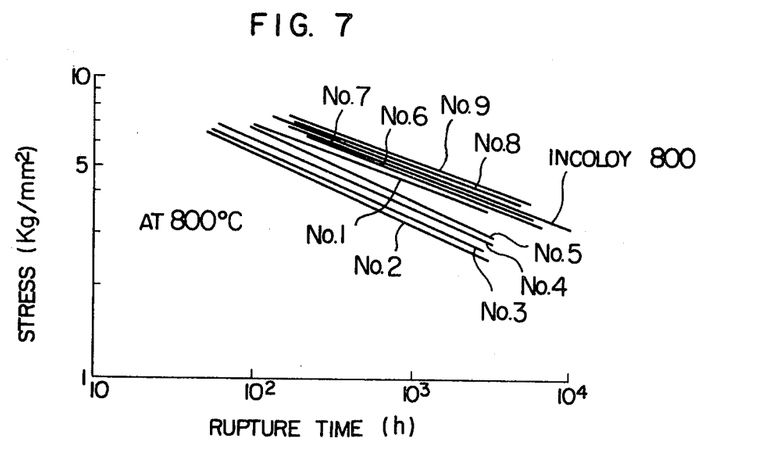
FIG. 7 is a graph showing the relationship between the creep rupture time and strength at 800° C. of the weld metal in Example 2.

A creep rupture test was conducted at 800° C. with the above-mentioned weld metals to examine the relationship between the creep rupture time and the stress, the result of which is shown in FIG. 7. Also, the reduction of area at the time of rupture in 800° C., 1000 hr rupture test is shown in FIG. 8.

Figure 8:
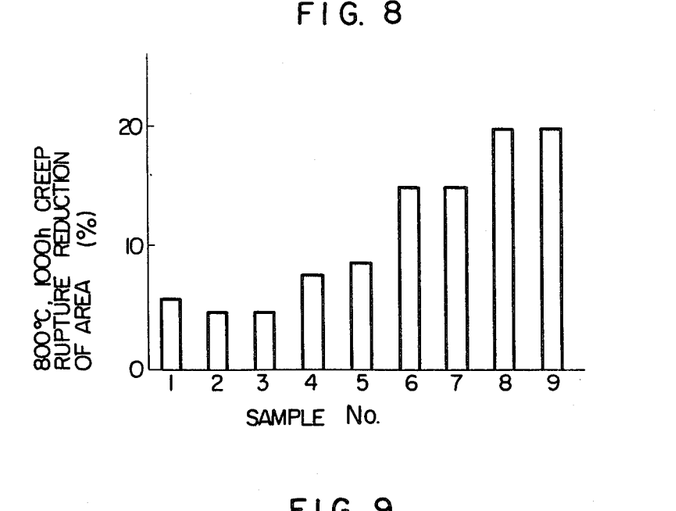
FIG. 8 is a bar graph showing the 800° C., 1000 hr creep rupture reduction of area of weld metal in Example 2.

From FIGS. 7 and 8, it will be seen that the conventional weld metal Nos. 1 to 5 exhibit creep rupture strength lower than that of the base metal of Incoloy 800, while the weld metal Nos. 6 to 9 in accordance with the invention show creep rupture strength substantially equivalent to or higher than that of the Incoloy 800.

Concerning the creep rupture ductility, while the conventional materials showed reduction of area of less than 10% in the 800° C., 1000 hr creep rupture test, the weld metal Nos. 6 and 7 Nos. 8 and 9 in accordance with the invention showed reductions of area of 15% and 20%, respectively. Thus, the weld metals in accordance with the invention has much higher ductility than the conventional materials. Although it is practically impossible to obtain a weld metal having a ductility equivalent to that of the base metal, it is considered ideal that the weld metal should have a ductility of at least a half of that of the base metal. Further, in order to avoid occurrence of cracking due to embrittlement during the use, the weld metal should have a ductility of at least 10%. From this point of view, all of the weld metals of the invention, which exhibit ductility of 10% or greater while the base metal has a ductility of 40%, are quite satisfactory with regard to the ductility.

Thus, the weld metals of the invention in Example 2 have both of thermal expansion coefficients equivalent to those of austenitic structural steels and high weldability. The structure welded with such weld metals exhibit remarkable high temperature creep rupture strength and creep rupture ductility and, hence, a wide application.

EXAMPLE 3

Table 5 shows the chemical compositions of the weld metals used in an experiment in terms of weight percent (wt%). Sample Nos. E-2, C-1 and C-2 weld metals in accordance with the invention.

TABLE 5

| Sample No. | C | Si | Mn | Ni | Cr | Mo | Nb | Ti | Fe |
|---|---|---|---|---|---|---|---|---|---|
| A-1 | 0.08 | 0.47 | 1.96 | 31.8 | 24.0 | — | — | — | bal. |
| A-2 | 0.07 | 0.46 | 2.24 | 34.3 | 23.3 | — | — | — | bal. |
| A-3 | 0.07 | 0.70 | 3.17 | 38.9 | 22.4 | — | — | — | bal. |
| B-1 | 0.09 | 1.40 | 3.21 | 38.1 | 22.6 | 0.64 | — | 0.17 | bal. |
| B-2 | 0.09 | 1.42 | 3.23 | 38.0 | 22.5 | 1.09 | — | 0.19 | bal. |
| B-3 | 0.09 | 1.43 | 3.19 | 37.8 | 22.4 | 1.64 | — | 0.19 | bal. |
| C-1 | 0.075 | 1.51 | 2.91 | 37.8 | 22.5 | 1.14 | 0.58 | 0.32 | bal. |
| C-2 | 0.075 | 1.51 | 2.86 | 37.5 | 22.4 | 1.12 | 0.80 | 0.27 | bal. |
| E-2 | 0.04 | 0.49 | 2.38 | 39.0 | 21.8 | 1.55 | 0.33 | — | bal. |

The weld materials were molten and casted under a vacuum and then subjected to a forging and hot rolling followed by a cold drawing to produce wires of 3.2 mm dia. The wires were then coated with a lime titania type coating. Build-up welding was conducted on a sheet of Incoloy 800 (0.08% C-0.45% Si-0.76% Mn-31.8% Ni-20.8% Cr-0.25% Al-0.52% Ti-balance Fe) in 5 to 7 layers with 10 to 13 passes welding under the welding condition of 24 V and 110 A. Test pieces were obtained from the weld metals thus formed and were subjected to a creep rupture test which was conducted at 800° C.

Figure 9:
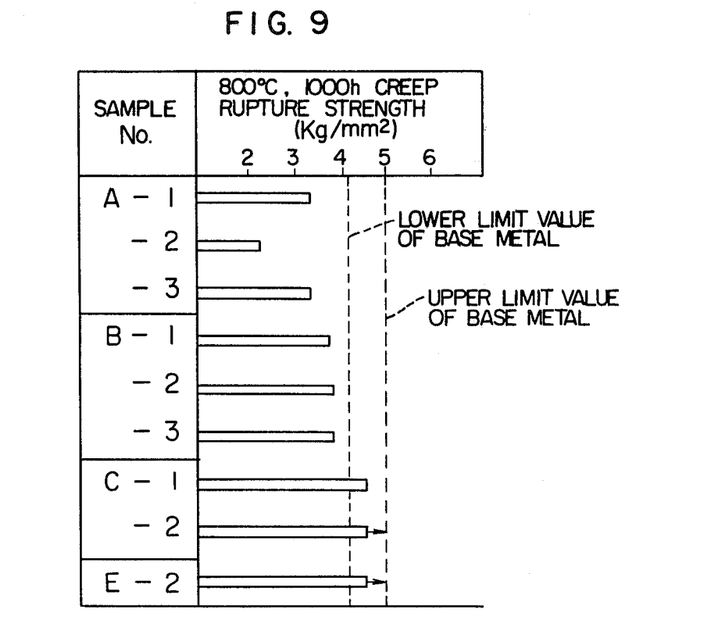
FIG. 9 is a bar graph showing 800° C., 1000 hr creep rupture strength of weld metal in Example 3.

FIG. 9 shows the creep rupture strength in 800° C., 1000 hr creep rupture test. From this Figure, it will be seen that the conventional weld metals A-1, A-2, A-3, B-1, B-2 and B-3 exhibit creep rupture stengths lower than that of the base metal which ranges between the lower limit value of 4.1 Kg/mm$^2$ and the upper limit value of 5.0 Kg/mm$^2$, whereas the weld metals C-1 and C-2 of the invention containing Mo, Nb and Ti showed creep rupture strengths equivalent to or greater than the mean creep rupture strength of the base metal. Also, the weld metal E-2 of the invention having a low C content and containing Mo and Nb showed a creep rupture strength greater than the mean creep rupture strength of the base metal.

Figure 10:
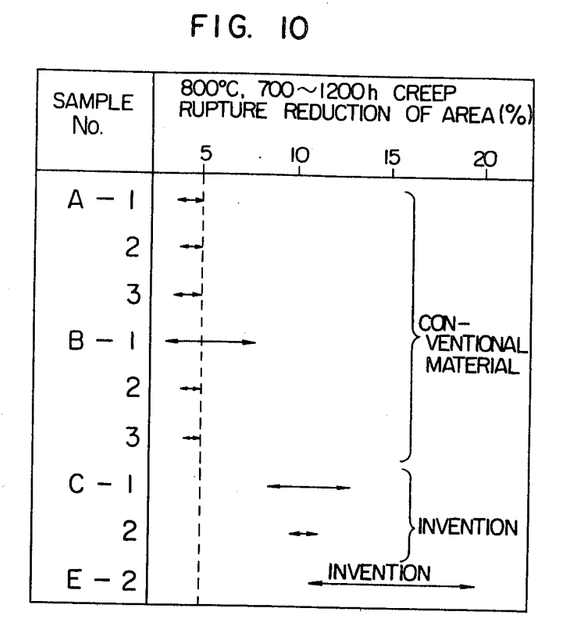
FIG. 10 is a bar graph showing 800° C., 700 to 1200 hr creep rupture reduction of area of weld metal in Example 3.

FIG. 10 shows the creep rupture reduction of area in a creep rupture test conducted at 800° C. for 700 to 1200 hours. The creep rupture reduction of area of the weld metal E-2 in accordance with the invention is about 20% which is just a half of that (40%) of the base metal of Incoloy 800. Hitherto, it has been considered ideal that the weld metal has a ductility which is at least a half of that of the base metal. Thus, the weld metal E-2 in accordance with the invention has an ideal rupture ductility. The conventional weld metals had ductility of lower than 10% and this low ductility was a cause of cracking during use at high temperature. In this connection, it is to be noted that the weld metals C-1 and C-2 in accordance with the invention exhibit rupture ductilities exceeding about 10% which are much higher than those of the conventional weld metals A-1, A-2, A-3, B-1, B-2 and B-3.

Figure 11:
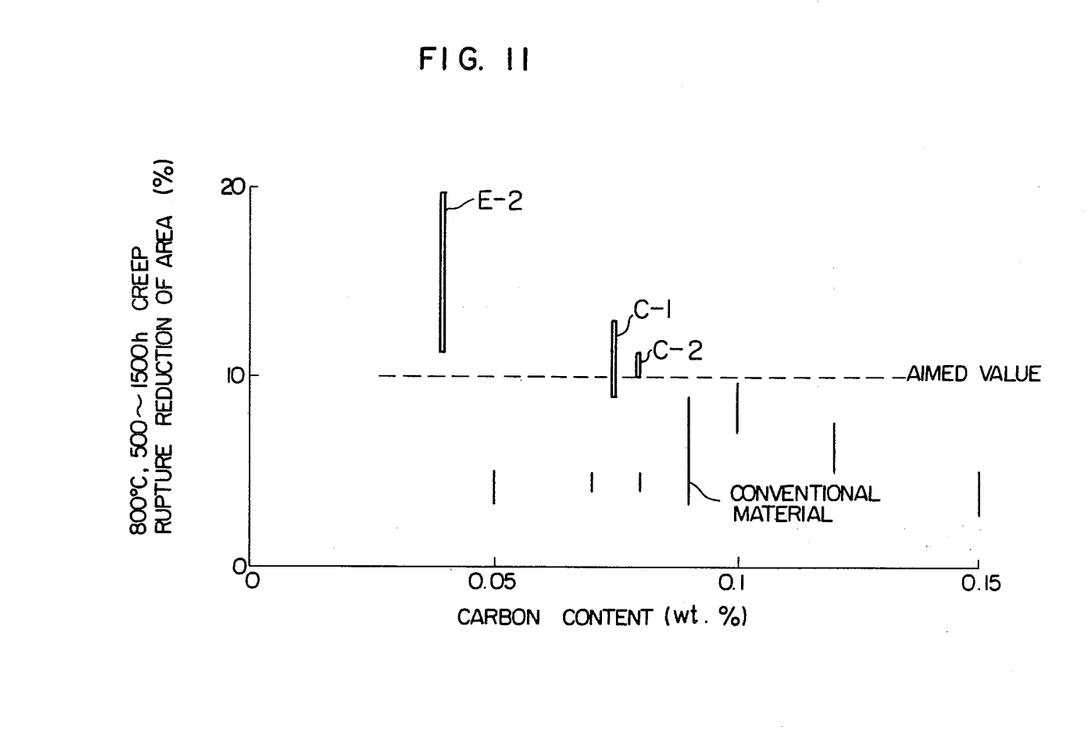
FIG. 11 is a graph showing the relationship between the C content and the 800° C., 500 to 1500 hr creep rupture reduction of area of weld metal in Example 3.

FIG. 11 shows the relationship between the C content and the creep rupture reduction of area in 800° C., 500 to 1500 hr creep rupture test. For obtaining a rupture ductility greater than 10%, the C content should be less than 0.75%. Taking the fluctuation into account, the weld metals C-1, C-2 and E-2 of the invention exhibiting rupture ductility in excess of 10% have C contents less than 0.75%.

As will be understood from the foregoing description, the weld joint formed with weld metals of the invention in Example 3 exhibits high creep rupture strength and creep rupture ductility, whereas, in the weld joint formed with the conventional weld metal, a thermal fatigue is caused by the thermal stresses applied repeatedly during the use at high temperature. In this case, owing to the facts that the strength of the weld metal is lower than that of the base metal and particularly that the ductility of the weld metal is lower than that of the base metal, such accidents that the cracks are formed in the weld metal have frequently occurred. In contrast, in the weld joint formed with the weld metal of the invention in Example 3, the thermal stress and strain are not concentrated to the weld metal but is born by the whole portion of the weld joint including the base metal so that the cracking in the weld metal due to thermal fatigue is remarkably suppressed, because a creep strength of the weld metal is equivalent to that of the base metal as shown in FIG. 10 and because the weld metal haa a rupture ductility of at least 10% which is much higher than that of the conventional weld metal as shown in FIG. 11. Once a crack is formed, it is necessary to repair the cracked part or renew the cracked part which in turn requires a long shutdown period of the plant thereby causing a serious damage from the economical point of view. It is, therefore, quite remarkable and advantageous that the cracking is avoided and the expense which may be incurred by the cracking is saved by the use of weld metals of the invention in Example 3.

EXAMPLE 4

Figure 12:
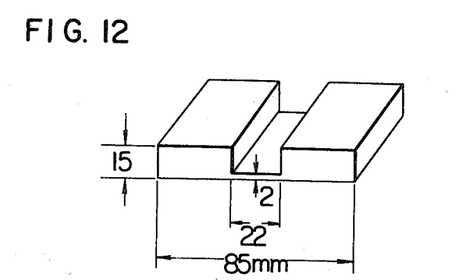
FIG. 12 is a perspective view illustrating the groove shape of base metal in Example 4.
Figure 13:
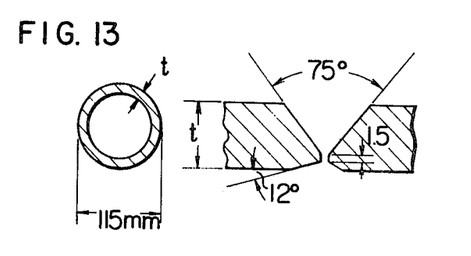
FIG. 13 is a schematic sectional view showing an example of the groove shape of base metal for fabricating a welded structure of a reaction pipe in a chemical plant.

Welding was conducted using an NCF steel (23% Cr-34% Ni) as the base metal, and various tests were carried out on the weld metal Nos. 1 to 11 shown in Table 6. More specifically, No. 1 is a conventional material, while Nos. 2 to 4 are comparative materials. Nos. 5 to 11 are weld metals in accordance with the invention. The respective weld metals were obtained by effecting the down hand welding to a base metal having a groove shape shown in FIG. 12. The welding current and voltage were 100 to 150 A D.C. and 21 to 23 V D.C., respectively, and the welding speed was 150 mm/min. The welding rods used had diameters of 3.2 mm and 4.0 mm with coating of lime-titania type flux containing calcium carbonate, fluorite, rutile, potassium feldspar, mica, silica sand, ferromanganese, ferrosilicon, etc. Incidentally, an example of the groove shape suitable for use in fabricating the welded structure of reaction pipe of an actual chemical plant is shown in FIG. 13.

The weld metal Nos. 1 to 11 thus obtained exhibited thermal expansion coefficients as shown in Table 7. Table 8 shows the results of FISCO cracking test, creep test and fatigue test.

The following facts are noted from Table 8. Regarding the FISCO cracking, the conventional weld metal No. 1 and the comparative weld metal Nos. 2 to 4 exhibit high FISCO cracking ratio of 20 to 32%, whereas, in the weld metal Nos. 5 to 11 in accordance with the invention, the FISCO cracking ratio is as small as 15 to 18%.

In addition, the weld metals of the invention exhibits a creep rupture strength at 800° C., 1000 hours of 5 Kg/mm² which is equivalent to or higher than that of the conventional weld metal, and a creep rupture elongation at 800° C., 1000 hours of 6% or greater which is more than about 150% of that of the conventional metal.

It is to be noted also that the weld metals of the invention exhibits a low cycle fatigue life of 600 times or higher at 800° C. and $\Delta\epsilon_t=0.7\%$, which is more than 150% of that of the conventional weld metal.

As has been described, according to the weld metal of the invention in Example 4, it is possible to prevent the thermal stress from concentrating to the weld zone without deteriorating the weldability, and to withstand against the repeatedly applied thermal stresses because its fatigue life is superior. In consequence, it is possible to remarkably prolong the life of the weld zone against cracking.

EXAMPLE 5

The chemical compositions (wt%) of the samples used in the experiments are shown in Table 9. Each sample, after having been subjected to a solution heat treatment, was worked by grinding, finished with #800 emery paper and then subjected to a corrosion test. As the solution heat treatment, samples of No. 5 (SUS 304) and No. 6 (SUS 321) were heated at 1050° C. for 30 minutes and then water-quenched, while the samples of Nos. 1-4 of the invention and No. 7 (Incoloy 800) were heated at 1150° C. for 30 minutes and then water-quenched.

TABLE 9

| Sample No. | | C | Si | Mn | P | S | Ni | Cr | Mo | Nb | Ti | Al |
|---|---|---|---|---|---|---|---|---|---|---|---|---|
| Steel of invention | 1 | 0.035 | 0.81 | 0.98 | 0.019 | 0.007 | 32.3 | 25.5 | 1.25 | | | |
| | 2 | 0.041 | 0.83 | 0.92 | 0.020 | 0.006 | 31.9 | 24.1 | 2.13 | | 0.34 | |
| | 3 | 0.039 | 2.08 | 1.12 | 0.018 | 0.008 | 30.8 | 22.1 | 1.42 | 0.38 | | |
| | 4 | 0.059 | 3.12 | 1.34 | 0.022 | 0.007 | 30.9 | 22.4 | 1.46 | 0.46 | | |
| Comparative steel | 5 SUS 304 | 0.060 | 0.63 | 1.74 | 0.021 | 0.006 | 9.20 | 18.5 | | | | |
| | 6 SUS 321 | 0.048 | 0.59 | 1.65 | 0.014 | 0.008 | 10.87 | 19.7 | | | 0.31 | |
| | 7 Incoloy 800 | 0.075 | 0.32 | 1.18 | 0.019 | 0.007 | 31.07 | 20.8 | | | 0.43 | 0.47 |

Figure 15:
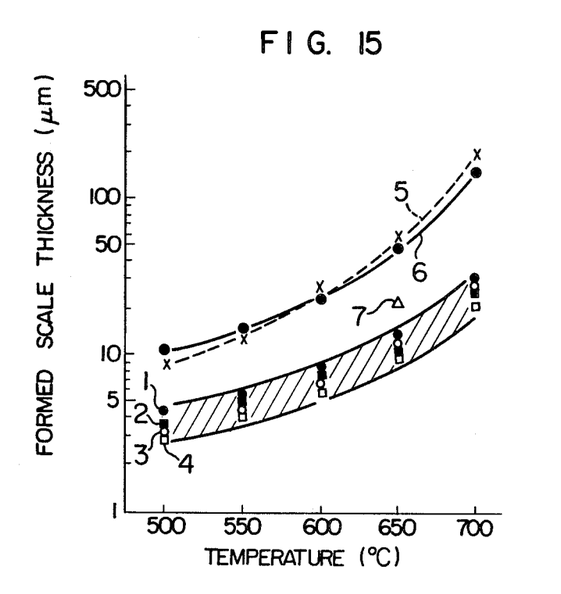
FIG. 15 is a graph showing the relationship between the formed scale thickness and the heating temperature in Example 5.

FIG. 15 shows the relationship between the temperature and the formed scale thickness when each sample was corroded in a steam at a temperature of 500° to 700° C. for 1000 hours. As may be apparent from this Figure, the steel of the invention exhibits such a tendency that with increase in Si content the higher resistance to

TABLE 6

| | No. | C | Si | Mn | Ni | Cr | Co | Mo | W | V | Nb + Ta | Ti | Zr | N | Cu |
|---|---|---|---|---|---|---|---|---|---|---|---|---|---|---|---|
| * | 1 | 0.030 | 0.44 | 0.26 | 61.5 | 21.0 | 8.8 | 3.5 | | | | | | | |
| Comparative material | 2 | 0.08 | 0.47 | 1.96 | 31.8 | 24.0 | | | | | | | | | |
| | 3 | 0.09 | 1.40 | 3.21 | 38.1 | 22.6 | | 1.64 | | | 0.09 | 1.17 | | | |
| | 4 | 0.05 | 1.35 | 2.37 | 37.2 | 22.8 | | 1.02 | | | | | | 0.08 | |
| Material of invention | 5 | 0.040 | 0.49 | 2.38 | 39.0 | 21.8 | 0.6 | 1.55 | | | 0.30 | | | 0.10 | |
| | 6 | 0.05 | 0.56 | 2.50 | 34.5 | 22.4 | 0.9 | 1.42 | | | 0.29 | 0.20 | | 0.09 | |
| | 7 | 0.070 | 0.62 | 2.20 | 34.6 | 21.9 | 0.8 | 1.32 | 0.07 | | 0.39 | | 0.30 | 0.07 | 1.2 |
| | 8 | 0.021 | 0.58 | 2.32 | 35.2 | 22.2 | 1.2 | 1.30 | | 0.06 | 0.40 | | | 0.09 | |
| | 9 | 0.019 | 0.71 | 2.29 | 33.9 | 22.3 | 0.9 | 1.38 | 0.05 | 0.02 | 0.28 | | | 0.14 | |
| | 10 | 0.052 | 0.65 | 2.40 | 35.2 | 22.8 | 0.8 | 1.40 | | | 0.33 | 0.12 | 0.22 | 0.12 | |
| | 11 | 0.043 | 0.49 | 2.38 | 35.0 | 21.8 | 0.7 | 1.41 | | | 0.39 | | | 0.11 | 1.8 |

* Conventional material

TABLE 7

| | 700° C. | 800° C. |
|---|---|---|
| No. 1 | $15.0 \times 10^{-6}/°C.$ | $15.5 \times 10^{-6}/°C.$ |
| No. 2–No. 4 | $17.3 \times 10^{-6}/°C.$ | $17.9 \times 10^{-6}/°C.$ |
| No. 5–No. 11 | $17.1$ ~$17.5 \times 10^{-6}/°C.$ | $17.8$ ~$18.0 \times 10^{-6}/°C.$ |

TABLE 8

| No. | FISCO cracking ratio (%) | 800° C., 1000 h creep rupture (Kg/mm²) | 800° C., 1000 h creep rupture elongation (%) | 800° C., $\Delta\epsilon_t = 0.7\%$ low cycle fatigue life (h) |
|---|---|---|---|---|
| 1 | 23 | 5.0 | 4 | 420 |
| 2 | 30 | 3.6 | 4 | 370 |
| 3 | 32 | 4.6 | 4 | 390 |
| 4 | 20 | 3.8 | 4 | 320 |
| 5 | 15 | 5.0 | 8 | 640 |
| 6 | 18 | 5.0 | 8 | 630 |
| 7 | 16 | 5.2 | 7 | 610 |
| 8 | 16 | 5.3 | 8 | 620 |
| 9 | 18 | 5.5 | 6 | 600 |
| 10 | 15 | 5.0 | 8 | 630 |
| 11 | 15 | 5.0 | 8 | 610 | steam oxidation is obtained, and it is seen that comparing with comparative samples of No. 5 (SUS 304) and No. 6 (SUS 321) the resistance to steam oxidation of the steel according to the invention is about three times or more as high as that of conventional steels. Especially, there is such a tendency that the difference in corrosion resistance between the steel of the invention and the conventional steels (Nos. 5 and 6) becomes larger with increase in temperature. Further, it is seen that the steel of the invention has a higher corrosion resistance than the Incoloy 800 (No. 7) which is also an iron base heat-resistant alloy.

Figure 16:
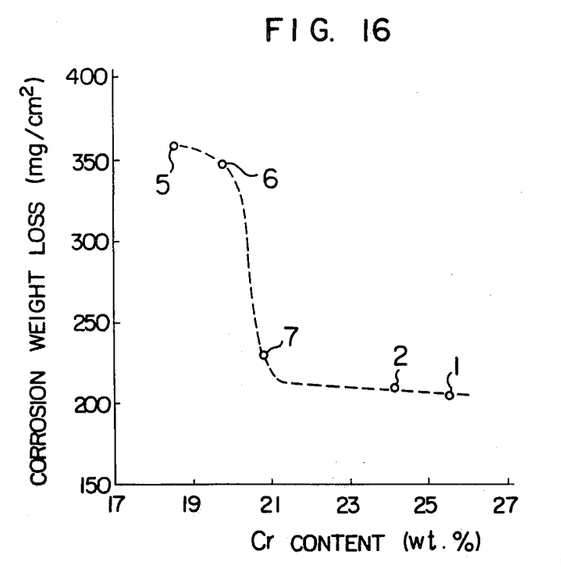
FIGS. 16 and 17 are graphs showing respectively the relationship between the corrosion weight loss in high temperature corrosion, the Cr content and Si content in Example 5.
Figure 17:
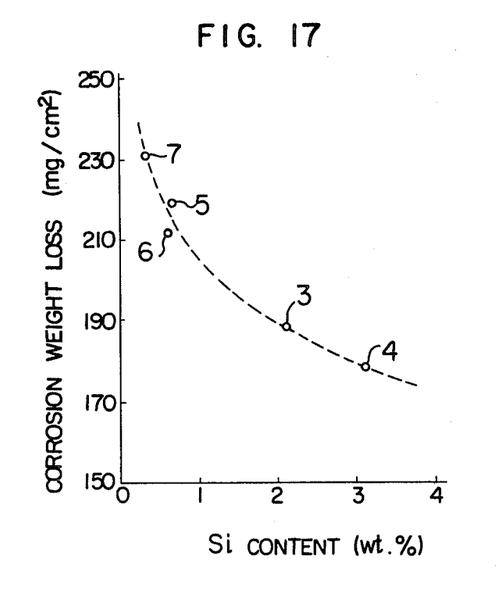

FIGS. 16 and 17 are graphs showing respectively relationship between the corrosion weight loss, the Cr content and the Si content when each sample, after having been coated with a coating of $Na_2SO_4+V_2O_5$ (1:6), was corroded at 800° C. for 300 hours in a gas having a composition of 10% $CO_2$+1% $SO_2$+5% $O_2$+balance $N_2$. As may be understood also from the results shown in FIGS. 16 and 17, the steel of the invention exhibits a high temperature corrosion resistance which is twice or more as high as those of the comparative steels No. 5 (SUS 304) and No. 6 (SUS 321). Further, comparing with the comparative steel No. 7 (Incoloy 800), it is apparent that the steel of the invention exhibits a corrosion resistance which is equal to or higher than that of the former.

Further, as shown in FIG. 16, when the Cr content is made to more than 20.5%, especially more than 21%, an excellent corrosion resistance is obtained.

From FIG. 17 it is seen that the Si improves the corrosion resistance markedly.

Figure 14:
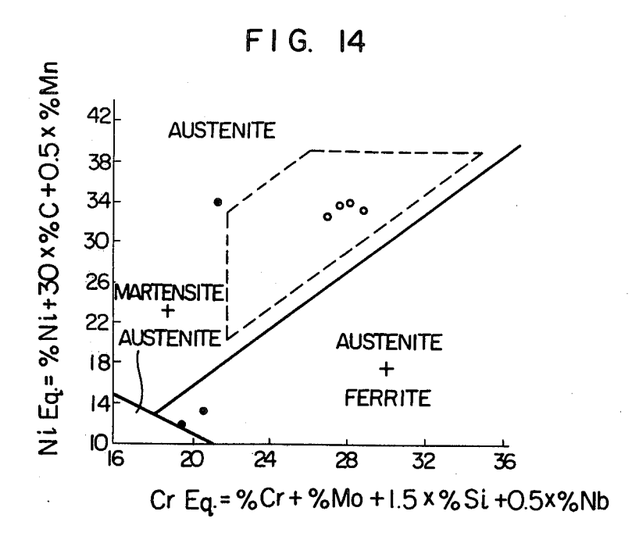
FIG. 14 is a graph showing the relationship between the Cr Equivalent and the Ni Equivalent in Example 5.

In FIG. 14, the Ni Equivalent and Cr Equivalent of the steel of the invention (mark o) and the comparative steels (mark o) are shown. It has been confirmed that the steel of the invention does not crack when it is worked by an extrusion process or Mannesmann process to produce a seamless steel pipe. It has been also confirmed that the steel of the invention exhibits a tensile elongation of 40% up to a temperature of around 600° C. and the elongation linearly increases from this point to 90% at 800° C.

As has been described, compared with conventional steels such as SUS 304, SUS 321 and iron base heat-resistant alloy (Incoloy 800), the steel of the invention in Example 5 has a markedly superior high temperature corrosion resistance against the combustion gas and the steam oxidation to which the inner and outer walls of a tube are exposed and which become problems in a coal combustion boiler, and thus brings about marked advantage in that when it is used in a boiler tube for power plant a power generating efficiently is increased.

What is claimed is:

1. A heat-resistant and corrosion-resistant alloy consisting of a weld metal that has a 1,000-hr creep rupture strength of at least 4 Kg/mm² at 800° C. and a 1,000-hr creep rupture elongation of at least 6% at 800° C. and that consists essentially of, by weight, less than 0.08% of C, 0.1 to 1.0% of Si, 2 to 3% of Mn, 32 to 42% of Ni, 21 to 25% of Cr, 0.8 to 1.7% of Mo, 0.1 to 1.0% of Nb, up to 0.5% of Ti, up to 2% of Co, up to 2% of Cu, up to 1% of W, up to 0.2% of N, up to 1.0% of V, up to 1.0% of Zr, up to 1.0% of Ta and the balance Fe, wherein the following conditions are met:

| Ti + Zr ≦ 1.0%; | Ni + Co ≦ 42%; |
| W + V ≦ 1.0%; | Nb + Ta ≦ 1.0%; and |
| 4 ≦ Nb/C ≦ 15. | |

2. An austenitic welded structure composed of an austenitic structural alloy containing by weight, 0.02 to 0.06% of C, 0.1 to 3.5% of Si, less than 2% of Mn, 20 to 38% of Ni; 20.5 to 27% of Cr, 1.0 to 1.6% of Mo, 0.1 to 1.0% of Nb, 0.05 to 1.0% of V and 0.1 to 1.0% of Zr, and of a weld metal that has a 1,000-hr creep rupture strength of at least 4 Kg/mm² at 800° C. and a 1,000-hr creep rupture elongation of at least 6% at 800° C. and that consists essentially of, by weight, 0.02 to 0.06% of C, 0.1 to 1.0% of Si, 2 to 3% of Mn, 33 to 42% of Ni, 21 to 25% of Cr, 1.0 to 1.6% of Mo, 0.1 to 1.0% of Nb, 0.1 to 0.5% of Ti, 0.05 to 1.0% of W, 0.05 to 1.0% of V and the balance Fe.

3. An austenitic welded structure composed of an austenitic structural alloy containing, by weight, 32 to 38% of Ni and 20.5 to 25% of Cr, and of a weld metal that has a 1,000-hr creep rupture strength of at least 4 Kg/mm² at 800° C. and a 1,000-hr creep rupture elongation of at least 6% at 800° C. and that consists of, by weight, 0.02 to 0.075% of C, 0.1 to 1.5% of Si, 2 to 3% of Mn, 32 to 38% of Ni, 21 to 25% of Cr, 1 to 1.6% of Mo, 0.1 to 1% of Nb, 0.1 to 1% of Ti and/or Zr and the balance Fe.

4. A heat-resistant and corrosion-resistant alloy consisting of a weld metal according to claim 1, wherein the following conditions are met:
31 ≦ Ni Equivalent ≦ 46
20.5 ≦ Cr Equivalent ≦ 30
in which the Ni Equivalent = %Ni + 30x%C + 30x%N + 0.5x%Mn and the Cr Equivalent = %Cr + %Mo + 1.5x%Si + 0.5x%Nb.

5. An austenitic welded structure according to claim 2, 3, wherein said structural alloy and said weld metal meet the following conditions, respectively:
22 ≦ Ni Equivalent ≦ 38
24 ≦ Cr Equivalent ≦ 33, and
31 ≦ Ni Equivalent ≦ 46
20.5 ≦ Cr Equivalent ≦ 30
in which the Ni Equivalent = %Ni + 30x%C + 30x%N + 0.5%Mn and the Cr Equivalent = %Cr + %Mo + 1.5x%Si + 0.5x%Nb.

6. A heat-resistant and corrosion-resistant alloy consisting of a weld metal according to claim 1 containing, by weight, 0.02 to 0.07% of C, 0.5 to 1% of Si, 2.3 to 2.7% of Mn, 32 to 35% of Ni, 22 to 24% of Cr, 1.2 to 1.5% of Mo and 0.2 to 0.6% of Nb.

7. An austenitic welded structure according to claim 3, wherein said structural steel further contains, by weight, 0.15 to 0.6% of Ti and 0.15 to 0.6% of Al.

8. An austenitic welded structure according to claims 2, 3 or 7, wherein said weld metal consists essentially of, by weight, 0.03 to 0.06% of C, 0.3 to 0.6% of Si, 2 to 3% of Mn, less than 0.015% of P, less than 0.015% of S, 34 to 40% of Ni, 21 to 25% of Cr, 1.0 to 1.5% of Mo and 0.3 to 0.6% of Nb.

9. An austenitic welded structure composed of an austenitic structural alloy containing by weight, less than 0.08% of C, 0.5 to 3.5% of Si, less than 2.0% of Mn, 20 to 38% of Ni, 20.5 to 27% of Cr, 1 to 1.6% of Mo and 0.1 to 1% of Nb, and of a weld metal that has a 1,000-hr creep rupture strength of at least 4 Kg/mm² at 800° C. and a 1,000-hr creep rupture elongation of at least 6% at 800° C. and that consists essentially of, by weight, 0.02 to 0.08% of C, 0.1 to 1.5% of Si, 2 to 3% of Mn, 32 to 38% of Ni, 21 to 25% of Cr, 1 to 1.6% of Mo, 0.1 to 1% of Nb and the balance Fe.

10. An austenitic welded structure composed of an austenitic structural alloy containing, by weight, less than 0.08% of C, 0.5 to 3.5% of Si, less than 2.0% of Mn, 20 to 38% of Ni, 20.5 to 27% of Cr, 1 to 1.6% of Mo and 0.1 to 1.0% of Nb, and of a weld metal that has a 1,000-hr creep rupture strength of at least 4 Kg/mm² at 800° C. and a 1,000-hr creep rupture elongation of at least 6% at 800° C. and that consists essentially of, by weight, 0.02 to 0.08% of C, 0.1 to 1.5% of Si, 2 to 3% of Mn, 32 to 38% of Ni, 21 to 25% of Cr, 1 to 1.6% of Mo, 0.1 to 1.0% of Nb, 0.1 to 0.5% of Ti and the balance Fe.

11. An austenitic welded structure composed of an austenitic structural alloy containing, by weight, less than 0.08% of C, 0.5 to 3.5% of Si, less than 2.0% of Mn, 20 to 38% of Ni, 20.5 to 27% of Cr, 1 to 1.6% of Mo, 0.1 to 1.0% of Nb and 0.1 to 0.5% of Ti and/or Zr, and of a weld metal that has a 1,000-hr creep rupture strength of at least 4 Kg/mm² at 800° C. and a 1,000-hr creep rupture elongation of at least 6% at 800° C. and that consists essentially of, by weight, 0.02 to 0.08% of C, 0.1 to 1.5% of Si, 2 to 3% of Mn, 32 to 38% of Ni, 21 to 25% of Cr, 1 to 1.6% of Mo, 0.1 to 1.0% of Nb and the balance Fe.

12. An austenitic welded structure composed of an austenitic structural alloy containing, by weight, less than 0.08% of C, 0.5 to 3.5% of Si, less than 2.0% of Mn, 20 to 38% of Ni, 20.5 to 27% of Cr, 1 to 1.6% of Mo, 0.1 to 1.0% of Nb and 0.1 to 0.5% of Ti and/or Zr, and of a weld metal that has a 1,000-hr creep rupture strength of at least 4 Kg/mm² at 800° C. and a 1,000-hr creep rupture elongation of at least 6% at 800° C. and that consists essentially of, by weight, 0.02 to 0.08% of C, 0.1 to 1.5% of Si, 2 to 3% of Mn, 32 to 38% of Ni, 21 to 25% of Cr, 1 to 1.6% of Mo, 0.1 to 1% of Nb, 0.1 to 0.5% of Ti and the balance Fe.

13. An austenitic welded structure composed of an austenitic structural alloy containing, by weight, 0.02 to 0.06% of C, 0.1 to 3.5% of Si, less than 2% of Mn, 20 to 38% of Ni; 20.5 to 27% of Cr, 1.0 to 1.6% of Mo, 0.1 to 1.0% of Nb, 0.05 to 1.0% of V and 0.1 to 1.0% of Zr, and of a weld metal that has a 1,000-hr creep rupture strength of at least 4 Kg/mm² at 800° C. and a 1,000-hr creep rupture elongation of at least 6% at 800° C. and that consists essentially of, by weight, less than 0.08% of C, 0.1 to 1.0% of Si, 2 to 3% of Mn, 32 to 42% of Ni, 21 to 25% of Cr, 0.8 to 1.7% of Mo, 0.1 to 1.0% of Nb, up to 0.5% of Ti, up to 2% of Co, up to 2% of Cu, up to 1% of W, up to 0.2% of N, up to 1.0% of V, up to 1.0% of Zr, up to 1.0% of Ta and the balance Fe, wherein the following conditions are met:

$Ti + Zr \leq 1.0\%$; $\quad Ni + Co \leq 42\%$;
$W + V \leq 1.0\%$; $\quad Nb + Ta \leq 1.0\%$; and
$4 \leq Nb/C \leq 15$.

14. An austenitic welded structure composed of an austenitic structural alloy containing, by weight, 32 to 38% of Ni and 20.5 to 25% of Cr, and of a weld metal that has a 1,000-hr creep rupture strength of at least 4 Kg/mm² at 800° C. and a 1,000-hr creep rupture elongation of at least 6% at 800° C. and that consists essentially of, by weight, less than 0.08% of C, 0.1 to 1.0% of Si, 2 to 3% of Mn, 32 to 42% of Ni, 21 to 25% of Cr, 0.8 to 1.7% of Mo, 0.1 to 1.0% of Nb, up to 0.5% of Ti, up to 2% of Co, up to 2% of Cu, up to 1% of W, up to 0.2% of N, up to 1.0% of V, up to 1.0% of Zr, up to 1.0% of Ta and the balance Fe, wherein the following conditions are met:

$Ti + Zr \leq 1.0\%$; $\quad Ni + Co \leq 42\%$;
$W + V \leq 1.0\%$; $\quad Nb + Ta \leq 1.0\%$; and
$4 \leq Nb/C \leq 15$.

15. An austenitic welded structure composed of an austenitic structural alloy containing, by weight, less than 0.08% of C, 0.5 to 3.5% of Si, less than 2.0% of Mn, 20 to 38% of Ni, 20.5 to 27% of Cr, 1 to 1.6% of Mo, 0.1 to 1.0% of Nb and 0.1 to 0.5% of Ti and/or Zr, and of a weld metal that has a 1,000-hr creep rupture strength of at least 4 Kg/mm² at 800° C. and a 1,000-hr creep rupture elongation of at least 6% at 800° C. and that consists essentially of, by weight, less than 0.08% of C, 0.1 to 1.0% of Si, 2 to 3% of Mn, 32 to 42% of Ni, 21 to 25% of Cr, 0.8 to 1.7% of Mo, 0.1 to 1.0% of Nb, up to 0.5% of Ti, up to 2% of Co, up to 2% of Cu, up to 1% of W, up to 0.2% of N, up to 1.0% of V, up to 1.0% of Zr, up to 1.0% of Ta and the balance Fe, wherein the following conditions are met:

$Ti + Zr \leq 1.0\%$; $\quad Ni + Co \leq 42\%$;
$W + V \leq 1.0\%$; $\quad Nb + Ta \leq 1.0\%$; and
$4 \leq Nb/C \leq 15$.

* * * * *